Figure 1:
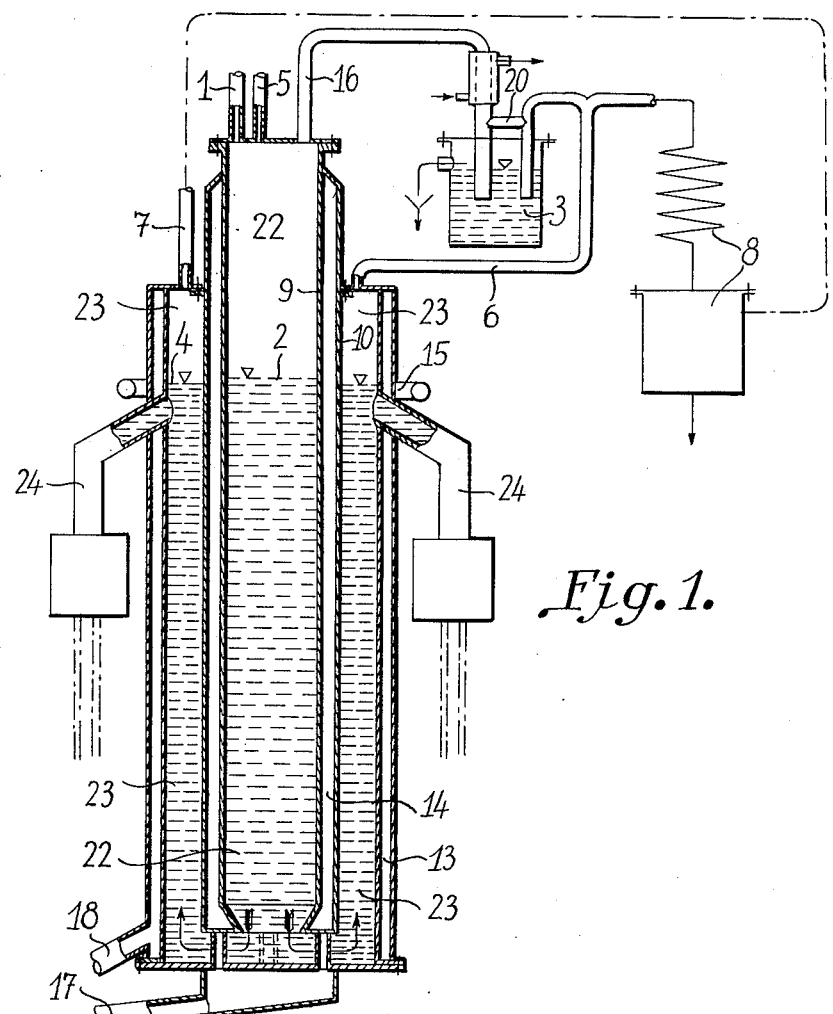

Oct. 22, 1957     L. HERELE     2,810,630
DEVICE FOR THE CONTINUOUS POLYMERIZATION AND EXTRUSION
OF ORGANIC SYNTHETIC SUBSTANCES, ESPECIALLY POLYAMIDES
Filed Oct. 25, 1954     2 Sheets-Sheet 1

INVENTOR
Ludwig Herele
BY Connolly and Hutz
his ATTORNEYS

United States Patent Office 2,810,630
Patented Oct. 22, 1957

2,810,630

DEVICE FOR THE CONTINUOUS POLYMERIZATION AND EXTRUSION OF ORGANIC SYNTHETIC SUBSTANCES, ESPECIALLY POLYAMIDES

Ludwig Herele, Bobingen, near Augsburg, Germany, assignor to Farbwerke Hoechst Aktiengesellschaft vormals Meister Lucius & Brüning, a corporation of Germany Application October 25, 1954, Serial No. 464,555

Claims priority, application Germany November 2, 1953

12 Claims. (Cl. 23—285)

It is known to prepare meltable polycondensation products, especially polyamides, from the starting materials by polymerization or polycondensation in upright vessels having usually a tubular form and to transfer the melted synthetic material from the bottom of the vessel directly to the members which extrude the melt in the form of filaments, wires, bands or foils. When manufacturing synthetic fibers, the melted polymer may be distributed immediately onto a number of spinneret assemblies.

Since the polymerization requires sometimes a comparatively long duration of stay in the reaction chamber, the reaction apparatus must have a considerable overall height and volume.

In addition, the problem of removing the vapors set free in the reaction melt, such as steam and/or the monomer, is not always solved in a satisfactory manner. In the case of the polymerization of caprolactam, for instance, a separate chamber was installed below the reaction vessel in which the almost finished polymerized melt is conducted over as large a surface as possible in order to withdraw the volatile constituents with the aid of an inert gas led past or by means of a pressure decrease.

Finally, a device has become known which has the following feature: The melt to be polymerized is pressed from below into a vertical coil of pipe by means of a high-pressure pump. At the top of the coil where the polymerization is concluded, the pressure is released and the melt is transferred into a vertical pipe being under pressure, which is mounted at the axis of the coil of pipe, and in which the polymer flows downwards and passes to a spinning pump. All these apparatus have a comparatively complicated construction and are not at all easy to operate.

The present invention relates to a device for the polymerization and direct spinning of organic synthetic substances, especially polyamides, from the melt. It is distinguished by a particularly simple and clear design, assures reliable working and is easy to operate.

The device according to the present invention comprises an upright cylindrical polymerization vessel provided with a heating jacket. It is closed on top and is fitted with feed pipes for the raw material and the protective gas and also with discharge pipes for the vapors. The lower end of the polymerization vessel passes over into another larger coaxial vessel which is also jacketed and the closed top of which is likewise provided with feed pipes for the protective gas and with discharge pipes for the vapors. One or several branch pipes lead off from the sides, each of which is connected to a spinning assembly. This spinning assembly can, for instance, consist of a spinning pump, a filter and a spinneret.

Figure 2:
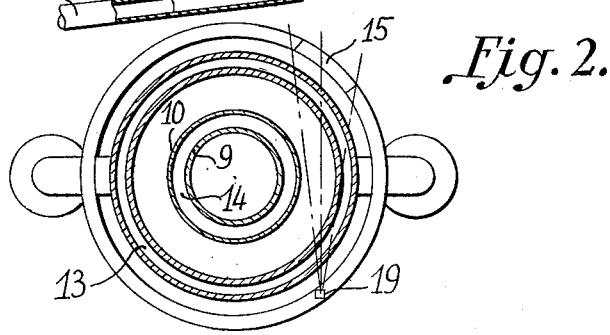

An apparatus according to the present invention is, for instance, illustrated in the Figures 1 and 2 of the accompanying drawings.

The device consists fundamentally of an upright cylindrical polymerization vessel 22 provided with a heating jacket 14 which is closed on top and is fitted with a feed pipe 1 for the raw material and a feed pipe 5 for the protective gas and also with discharge pipes 16 for the vapors set free in the melt. The lower end of the vessel passes over into a coaxial vessel 23 of a larger diameter which is likewise enclosed in a heating jacket 13. On top it is also provided with feed pipes 7 for the protective gas and with discharge pipes 6 for the vapors set free. From its outer side wall one or several pipes 24 lead off, which are connected to a spinning assembly (consisting of spinning pump, filter and spinneret).

The vessel 22 and the vessel 23, which encloses vessel 22 in a ring-like manner, form together a system of communicating vessels. The raw material which is supplied through the feed pipe 1 at the top of vessel 22 and which may consist of melted monomers or of a melted mixture of monomers and low polymers, if necessary with the continuous or intermittent addition of polymers in pieces to be melted again, enters the reaction vessel 22 solely under the force of gravity. In this vessel a uniform melt forms in which the polymerization constantly takes place. The melt rises, as soon as it touches the lower edges of the walls of the vessel 22, in the tubular outer vessel 23 until the levels of the melt in the vessels 22 and 23 have reached the same height. The advantage of the device resides in the fact that the entire transport of the polymerization melt through the 2 reaction vessels is effected without the aid of any mechanical transport means. A further considerable advantage resides in the fact that, due to the concentric arrangement of the two vessels 22 and 23, the heating jacket 14 of the vessel 22 heats the latter with its inner side and the outer ring vessel 23 with its outer side. In addition, the vessel 23 can be heated by its own outer heating jacket 13. Thus, the heat content of the heating gas is particularly well utilized.

The two heating jackets 14 and 13 of the vessels 22 and 23 can, for instance, be connected through the pipes 17 and 18 to form only one circuit of the heating agent, so that the same temperature is prevailing in the heating jackets 13 and 14. However, it is also possible to provide a separate circuit of the heating agent for each of the two heating jackets, so that the course of the polymerization which takes place on a U-shaped path from the melt level in the inner vessel 22 up to the melt level of the outer vessel 23, can be influenced by a graduated heating in so far as either the circuit of the heating agent for vessel 22 is heated to a higher temperature than that of vessel 23 or vice versa.

In addition to a feed pipe for the raw material, the reaction vessel 22 has on its top a feed pipe 5 for the protective gas in order to keep the melt level in vessel 22 in known manner under the protective gas.

Since, in the course of the reaction, steam or vapors of monomers develop from the melt, vessel 22 is, on its top, also provided with a discharge pipe 16 through which the protective gas charged with steam and monomeric vapors escapes. The gas passes to one or several condensation vessels 3 where the vapors are condensed and collected either by themselves or with the aid of a cooling aggregate 8. The protective gas freed from the vapors is conducted through a pipe, which is shown only diagrammatically and into which blowers and reheating aggregates are installed (not shown), to the return line 7 through which it passes then into the room or gas dome above the melt level in the outer ring vessel 23, since it is of advantage if the melt level of the outer ring vessel 23 is likewise kept under protective gas. As, in the course of the polymerisation reactions, vapors of low polymers can develop also from this melt level, the outer ring vessel 23 is provided on top with one or several discharge pipes 6 which lead to the condensation vessels 3 already mentioned, in which the low polymeric constituents are collected. The protective gas, however, which serves as carrier for these vapors is, after elimination of the vapors, led back to the return line 7. In order to avoid fluctuations of the levels, an equalization of pressure is produced by means of a connecting line 20 between the gas domes above the two melt levels.

Figure 2 shows a section through the concentric vessels 22 and 23 in the height of the melt level shown in Figure 1. 9 and 10 are walls of the reaction vessel 22 and the outer reaction vessel 23. 14 and 13 represent the respective inner and outer heating jackets. The level of the liquid 2 stands inside the walls 9, the level of the liquid 4 in ring-like manner between the outer perimeter of the heating jacket 14 and the inner perimeter of the heating jacket 13. Both levels of the liquid have about the same height because the vessels 22 and 23 form a system of communicating vessels. The heating jacket 13 of the outer tube is covered in known manner with an insulating layer. At 19 a radioactive preparation is embedded in a block of lead with the opening in the direction towards the interior of the tube system whilst opposite to it a Geiger-counter 15 is installed in the same height. Both organs are situated at the points of intersection of a secant passing through the outer reaction vessel with the greater peripheral line of the tube sytsem. The Geiger-counter 15 responds to the radium preparation 19 with a certain intensity as long as the melt level does not surmount the plane in which the two instruments are situated. The Geiger-counter is not influenced so intensely if the melt level rises and thereby hinders or prevents the radioactive rays from passing through the reaction space. It is of advantage to connect the Geiger-counter in regular short intervals to the respective amplifier by means of a controller cylinder so that the Geiger-counter indicates only in regular short intervals whether and in which intensity it receives radioactive rays through the reaction space. Thus, only one amplifier need to used for several of these arrangements. The Geiger-counter is connected in known manner to a relay which throttles the supply of the raw material to the top of the inner vessel 22 as soon as the impulses taken up by the Geiger-counter are weak or disappear and which increases the supply of the raw material as soon as the Geiger-counter receives strong impulses.

In the interior of the reaction vessel 22 there may also be installed several intermediate bottoms (not shown in the drawings) which do not disturb the passage of the melt through the reaction vessel but which enable the bubbles of steam and monomers forming in the melt to rise together and more easily through the melt into the upper part of vessel 22.

Figures 3, 4:
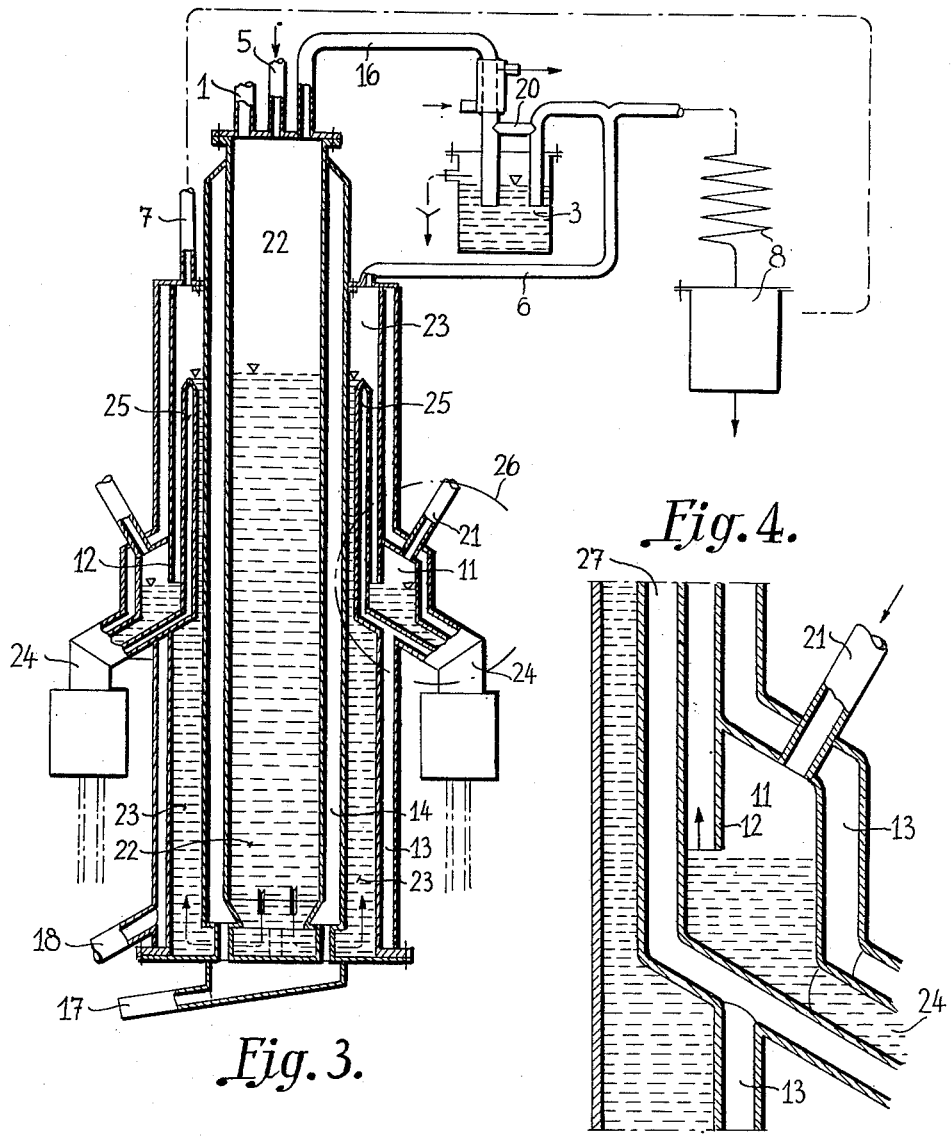

Figures 3 and 4 represent an especially advantageous modification of the device shown in Figures 1 and 2. Figure 3 shows, in the interior of the outer ring vessel 23, a concentric overflow ring wall 25 the lower end of which is connected tightly to the wall of the outer vessel 23 by means of a projection which has advantageously the form of a truncated cone surface, whilst, near this projection, the wall of vessel 23 has a ring-shaped enlargement 11 the lower part of which is provided with the discharge pipes 24 leading to the spinneret assemblies. By means of this overflow ring wall it is achieved that the melt rising in the ring vessel 23 can only rise between the overflow ring wall and the heating jacket 14. It flows over the top edge of the ring wall, trickles again downwards as a thin layer between the outer side of the ring wall 25 and the external inner wall of the ring vessel 23 and forms a new non-communicating sump in the ring-shaped room 11. Consequently, the ring-shaped room 11 represents a small storage room for the finished polymerized melt which, due to its passage as a thin layer over the ring wall 25, can be freed to a large extent from monomers.

In the case of the above described modification of the device, the readings of the melt level must be taken in the plane of the melt level in the ring-shaped room 11. Measurements of the melt level in the above described higher plane need not be made since these levels are fixed due to the installation of the overflow ring wall, that is to say that the level cannot rise to a height above the overflow edge of the ring wall 25.

The overflow ring wall 25 may also be of a hollow construction and may be connected to the circuit of a heating agent in order to supply, in addition, heat to the inner and outer surface of the melt. Figure 4 shows, on an enlarged scale, a part of the device of Figure 3 indicated by the circular arc 26. 27 is a part of the overflow ring wall which is hollow so that the heating agent can pass through. The interior of the wall is connected with the interior of the heating jacket 13 of the outer ring vessel 23 by one or several openings.

The outer wall of the ring vessel 23 which, as mentioned above, widens to a ring-shaped enlargement is extended in the form of a comparativley short cylindric ring wall 12 at the point where the wall begins to widen. The lower edge of this extended wall finishes just above the melt level. In this manner the ring room 11 is divided into 2 rooms which are only connected by the small space between the lower edge of the cylinder ring 12 and the normal level of the melt that collects in room 11. To the top of ring room 11 lead one or several feed pipes 21 for a safety or cleansing gas. Through these pipes the gas is forced into the ring room 11. On the one hand, the gas protects the melt level in this room against oxidizing influences, on the other hand, it passes around the lower edge of the cylinder ring wall 12 upwards along the overflow ring wall 25 into the steam dome above the top edge and, owing to the large surface of the melt on the overflow ring wall, it carries along monomers and low polymers in the form of their vapors. At a fixed and constant distance between the melt level in ring room 11 and the lower edge of the cylinder ring wall 12, a certain constant flow resistance results which has to be overcome by the supplied current of safety or cleansing gas. If the melt level in the ring room 11 falls under the intended height, the normal flow resistance of the protective gas decreases, if it rises above the intended height, this flow resistance increases. These variations in the flow resistance of the protective gas can be used in known manner for operating an alarm apparatus.

I claim:

1. Apparatus for the continuous polymerization of organic meltable synthetic substance comprising a substantially vertically arranged polymerization vessel closed at its upper end and open at its lower end, raw material supply means communicating with the polymerization vessel adjacent its upper end, protective gas supply means communicating with the polymerization vessel adjacent its upper end, vapor discharge means communicating with the polymerization vessel adjacent its upper end, a second and coaxially arranged polymerization vessel about the first polymerization vessel, the second polymerization vessel being closed at its upper and lower ends, protective gas supply means communicating with the second polymerization vessel adjacent its upper end, vapor discharge means communicating with the second polymerization vessel adjacent its upper end, means for withdrawing polymerized substance from the second polymerization vessel at a level adjacent its upper end but below that of its protective gas supply means, and means for heating organic meltable synthetic substance during residence in said apparatus.

2. The apparatus of claim 1 wherein the means for heating organic meltable synthetic substance during residence in said apparatus comprises a coaxially arranged heating jacket surrounding the first polymerization vessel and forming the inner vertical wall of the second polymerization vessel.

3. The apparatus of claim 2 including a coaxially-arranged heating jacket about the outer wall of the second polymerization vessel.

4. The apparatus of claim 3 wherein the heating jackets of the first and second polymerization vessels are arranged for differential heating of the two polymerization vessels.

5. The apparatus of claim 3 wherein the heating jackets of the first and second polymerization vessels are arranged for maintaining the temperature of the first and second polymerization vessels substantially equal.

6. The apparatus of claim 1 wherein the means for withdrawing polymerized substance from the second polymerization vessel comprises a concentric weir overflow means arranged for gravity discharge of polymerized substance and concentrically arranged collector means below and surrounding said weir overflow means.

7. The apparatus of claim 6 wherein the means for heating organic meltable synthetic substance during residence in said apparatus comprises a coaxially-arranged heating jacket surrounding the first polymerization vessel and forming the inner vertical wall of the second polymerization vessel.

8. The apparatus of claim 7 including a coaxially-arranged heating jacket about the outer wall of the second polymerization vessel.

9. The apparatus of claim 8 wherein the heating jackets of the first and second polymerization vessels are arranged for differential heating of the two polymerization vessels.

10. The apparatus of claim 8 wherein the heating jackets of the first and second polymerization vessels are arranged for maintaining the temperature of the first and second polymerization vessels substantially equal.

11. The apparatus of claim 1 including liquid level sensing means associated with the second polymerization vessel above the level of the means for withdrawing polymerized substance from the second polymerization vessel but below that of the protective gas supply means of the second polymerization vessel, means for controlling raw material supply to the raw material supply means communicating with the first polymerization vessel adjacent its upper end, and means actuating said last means in response to liquid level fall and rise indicated by said liquid level sensing means.

12. The apparatus of claim 1 including vapor condensing means for discharged vapor and protective gas mixture associated with the vapor discharge means communicating with the first and second polymerization vessels and means for returning vapor-freed, protective gas from said vapor condensing means to the second polymerization vessel adjacent its upper end.

References Cited in the file of this patent
UNITED STATES PATENTS

| | | |
|---|---|---|
| 2,240,618 | Harris | May 6, 1941 |
| 2,273,188 | Graves | Feb. 17, 1942 |
| 2,378,138 | Gaylor | June 12, 1945 |
| 2,577,856 | Nelson | Dec. 11, 1951 |